Figure 1:
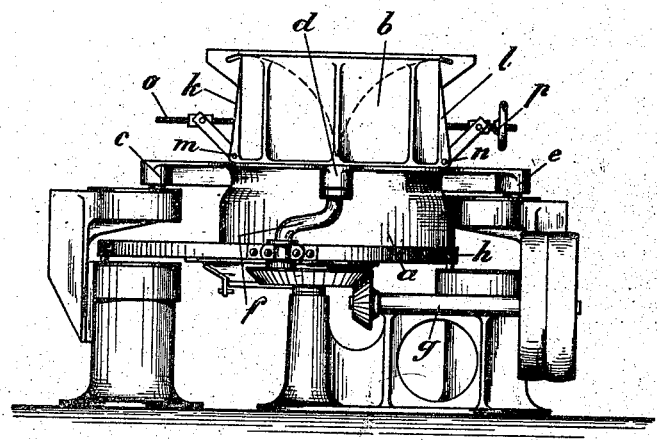
Figure 2:
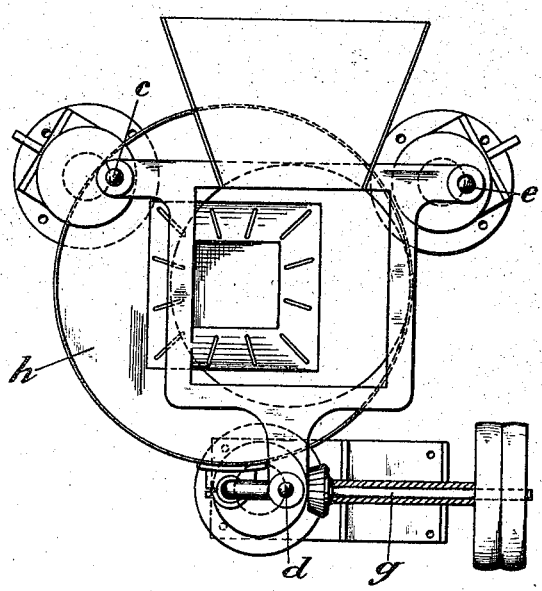

H. A. TEMPELAAR.
TEA LEAF ROLLING MACHINE.
APPLICATION FILED MAR. 30, 1921.

1,425,722.

Patented Aug. 15, 1922.

Inventor
H. A. Tempelaar
By Marks & Clerk
Attys.

UNITED STATES PATENT OFFICE.

HENDRIK ARIE TEMPELAAR, OF TANDJONG-KARANG, SUMATRA.

TEA-LEAF-ROLLING MACHINE.

1,425,722.   Specification of Letters Patent.   Patented Aug. 15, 1922.

Application filed March 30, 1921. Serial No. 457,134.

(GRANTED UNDER THE PROVISIONS OF THE ACT OF MARCH 3, 1921, 41 STAT. L., 1313.)

*To all whom it may concern:*

Be it known that I, HENDRIK ARIE TEMPELAAR, mechanician, a subject of the Queen of the Netherlands, residing at Tandjong-Karang, South Sumatra, have invented certain new and useful Improvements in Tea-Leaf-Rolling Machines (for which I have filed an application in the Netherlands, March 10, 1916, Patent No. 4671, Dec. 24, 1919), of which the following is a specification.

The majority of the usual tea leaf rolling machines are provided with a pressure device consisting of a piston adapted to be pressed by a screw spindle on to the tea leaves. Machines of this kind have the drawback that during the periods in which rolling is executed without pressure, the piston closes the cylindrical tea storage receptacle at its upper side, thus preventing the leaves from being exposed to the strongly desired cooling action.

It would be possible to raise the piston to such extent as to leave the tea storage receptacle free by increasing the height of the pressure device. However this causes the practical drawback that the machine as a whole obtains an undesired height. This is of very great importance with so called double acting tea leaf rolling machines in which the storage receptacle also executes a circular motion.

Devidson perceived these drawbacks and tried to correct them by constructing his "open top roller" in which a constant pressure on a continuously varying part of the leaves is exerted by plough shaped members arranged at the inner wall of the storage receptacle, these members causing a partial compression and at the same time a circulation of the tea leaves. However, these machines have proved to be unsatisfactory in practical use as they do not give a well rolled product.

The rolling machine according to the invention presents the advantages of compact construction, quick action and the obtaining of a perfect product. These advantages are obtained by arranging two opposite side walls of the storage receptacle, which has a square cross section, in such a pivotable manner that they may be lowered inwardly and brought under pressure. In its open position the storage receptacle occupies but a small height and an excellent cooling action is then exerted on the tea leaves.

The invention is explained by the accompanying drawing which illustrates the machine in side elevation and in plan view.

The tea storage receptacle consists of two portions $a$, $b$, the lower portion $a$ having a circular cross section, the upper portion $a$ square section. The receptacle is supported at three points $c$, $d$, $e$, the two former being journal bearings in discs running on balls and may be rotated by means of the crank $f$ which acts as a support for $d$ and is driven from the shaft $g$ by means of a bevel tooth wheel gear. This crank also drives the lower table $h$ which is supported in a similar way to the receptacle $a$.

Two opposite walls or flaps $k$ and $l$ of the upper portion $b$ of the tea storage receptacle are pivotable about horizontal axes $m$ and $n$. They may be kept in their vertical position or lowered inwardly and pressed by means of the screw spindle $o$ and the hand wheel $p$ as will be clear from the drawing.

The machine when started after the storage receptacle has been filled is rotated during about 15 minutes without the flaps having been lowered. During this period the tea leaves sink about 25 centimetres. Then the rolling process is continued during 5 minutes under a light pressure, the flaps being afterwards opened and the machine rotated during 10 minutes without any pressure being exerted on the tea leaves. Thereon the rolling takes place during 5 minutes under pressure again and so on until the process which as a whole takes 45–60 minutes is completed. A small quantity of tea leaves which might fall through between the flaps before the latter are closed arrive on the lower table and are rolled thereon.

Having now particularly described and ascertained the nature of my said invention and in what manner the same is to be performed, I declare that what I claim is:—

1. In a tea leaf rolling machine, the combination with a movable table and an open bottomed receptacle cooperating with the same, of pivotally mounted plates arranged at opposite sides of the receptacle, and means for moving the free ends of said plates towards and away from one another.

2. A combination of the kind defined by claim 1 in which the means for moving the free ends of the plates towards one another includes threaded spindles and operating wheels.

3. A tea leaf rolling machine including a table movable in a circular path, means for moving said table in a circular path, a receptacle arranged above said table and having an open bottom, means for moving said receptacle in a circular path, said receptacle having opposite side walls formed of pivotally mounted plates, and means for moving the free ends of said plates towards one another whereby material carried by the receptacle may be packed.

In testimony whereof I affix my signature.

H. ARIE TEMPELAAR.